June 20, 1950 W. K. LANKFORD 2,512,235
BEAM COMPASS
Filed March 7, 1947
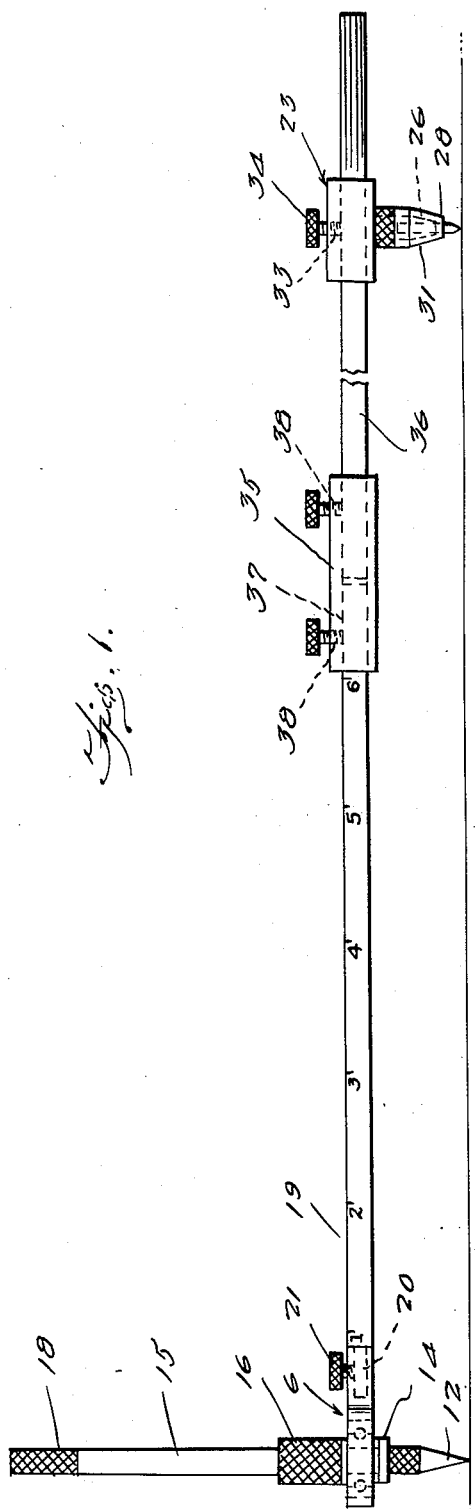
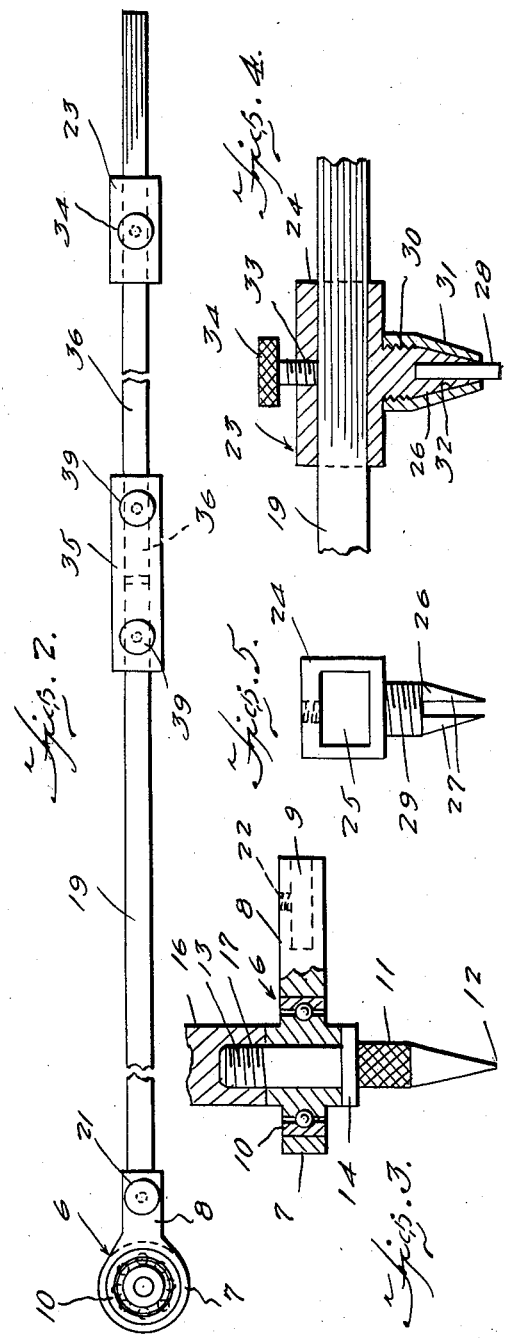
INVENTOR.
William K. Lankford
BY
McMorrow, Berman & Davidson
ATTORNEYS Patented June 20, 1950

2,512,235

UNITED STATES PATENT OFFICE 2,512,235

BEAM COMPASS

William K. Lankford, Roanoke, Va.

Application March 7, 1947, Serial No. 733,219

1 Claim. (Cl. 33—27)

My invention relates to compasses, particularly to a beam compass of new and novel design which may be used easily by draftsmen and others for the accurate drawing of circles and arcs having radii of greater length than the range of an ordinary compass.

It is a principal object of my invention to provide a beam compass which will have both horizontal and vertical balance in use due to a novel bracing and ball-bearing arrangement of the stem point, imparting a floating motion to the marking point, for ease in using.

It is an important object of my invention to provide a beam compass of the character described having extensible members easily assembled for lengthening the beam.

It is a still further object of my invention to provide a beam compass of the character described which is extremely accurate, and which, once set, will not easily get out of adjustment.

It is a still further object of my invention to provide a beam compass which is simple to manufacture, easy to assemble, and which can be compactly arranged for safe keeping in a relatively small carrying case.

Other objects and advantages of my invention will become apparent during the course of the following specification, and accompanying drawings, forming part of the specification, in which like numerals are used to designate like parts throughout the specification and drawings.

In the drawings:

Figure 1 is an elevational view of a beam compass embodying my invention.

Figure 2 is a plan view of the same.

Figure 3 is a longitudinal section, partly in elevation, of the bearing and stem point.

Figure 4 is a longitudinal section through the marking point and slidable mounting structure, the securing nut being shown on the marking point, and Figure 5 is an end elevational view of the marking point.

Referring now in detail to the drawings, the numeral 6 refers generally to a bearing member formed as a ring 7 having an outwardly extending arm 8 with an apertured recess 9 at the end thereof. Anti-friction ball-bearings 10 having two concentric races are arranged in the ring 8 for a purpose which will hereinafter become apparent. A cylindrical stem member 11, tapered to a point 12 at one end and having external threads 13 at its opposite end and an annular flange 14 intermediate the said ends, is arranged to pass through said bearing and depend therefrom, the top of the flange 14 bearing against the lower surface of the bearing when the said stem point is secured thereto. A bracing member in the form of a cylindrical main stem or handle 15 and having an enlarged diametered knurled portion 16 is provided with an internally threaded aperture 17 in which the upper threaded portion 13 of the stem member 11 is threadedly engaged secures the said stem member 11 in the bearing member 6 and is used to hold the said point 12 on the work when the compass is being used, there being a knurled portion 18 on the upper end of said main stem for facility in holding it.

A calibrated extension member 19, which may be either square or rectangular in cross section, is reduced adjacent one end thereof to provide a tongue 20 adapted to engage within the recess 9, to be secured therein by a set screw 21 threadedly engaged in an internally threaded opening 22 in the arm 8, the stem of the said set screw 21 impinging upon the reduced portion of the said member 19, the junction between the said extension member 19 and the arm 8 being a predetermined distance from the stem point.

The numeral 23 designates the marking point assembly of the invention. It comprises a longitudinal hollow member 24 having an internal bore 25 extending therethrough, the said bore being slightly greater in its cross-sectional dimensions than the member 19 to permit a sliding motion of the said assembly 23 when translated on the member 19, and a dependent tapered and split clutch portion 26 intermediate the ends of the longitudinal member 24, the jaws 27 of said clutch being spaced apart to engage a pencil lead 28, or a similar scribing point as desired, therebetween. The clutch 26 is also provided with exterior screw threads 29 above the taper and adjacent the bottom of the member 24 adapted to threadedly engage, as at 30, the internal threads of a nut 31 having an internally tapered portion of its bore 32 adapted to have a sliding fit on the tapered portion of the clutch 26, to be drawn upward thereon by the tightening of the nut thereby forcing the jaws 27 toward each other to secure the lead 28 therebetween. The member 24 is also provided with an internally threaded opening 33 axially aligned with the portion 26 adapted to threadedly engage a set screw 34 for securing the assembly on the member 19 in a predetermined position relative to the stem point 12, to describe a circle within the range of the calibrated member 19, or a similar but longer calibrated member 36.

The operation of a beam compass is too well known to need detailed explanation. It is sufficient to state, that by holding the compass at the main stem 15, the point 12 upon a center and the lead 28 spaced a determinable distance away and resting on a paper or other surface in the same plane as the point 12, the user may swing the marking point through a complete circle or an arc of any length less than a circle as desired within the limits of the calibrated member 19, only one hand being needed to securely hold the main stem. The ball-bearings 10 permit full floating movement of the marking point and, in association with the horizontal and vertical balance of the compass, accuracy and ease of performance is assured.

It frequently becomes necessary to draw a circle having a radius beyond the range of the extension 19. I have provided for such a contingency by means of a stabilizing element 35 and a lengthening bar 36, of similar cross-section to the extension member 19. The element 35 is arranged with a through bore 37 large enough to permit snug engagement of the member 19 and bar 36 therein, there being spaced apart threaded openings 38 in the top of said element to threadedly engage a pair of set screws 39 adapted to impinge upon the respective adjacent opposed ends of the said member 19 and bar 36 when inserted in opposite ends of the said element to secure them firmly therein. The marking point assembly will then be placed on the said bar for relative translative movement in the same manner as heretofore described. This will greatly increase the working range of the compass, and it may be used in exactly the same manner already described in connection with extension 19.

I prefer to make all of the parts of my beam compass of aluminum or 1020 steel, except the ball-bearings 10 which will be of the standard type supplied by ball-bearing manufacturers.

I have thus described my invention in the form best known to me at this time. It is to be understood however, that changes in the shape and arrangement of the parts may be made within the scope of the sub-joined claim without departing from the spirit of the invention.

Having thus described my invention, I claim:

In a beam compass, a beam adapted to swing horizontally about a fixed center, a generally flat and relatively thin bearing plate having a large transverse bore extending therethrough, said bearing plate including an integral substantially radial extension having a longitudinal opening forming a socket receiving one end of said beam for securing the bearing plate thereto, a single ball bearing mounted within said bore of the bearing plate and including a freely rotatable inner race having a bore, the inner race being of substantially the same axial thickness as the bearing plate, an elongated stem mounted within the bore of the inner race and having an annular radial flange contacting one end of the inner race to prevent axial movement of the stem in one direction, a pointed centering extension formed integral with the stem and projecting axially beyond said annular flange, the stem having a screw threaded extension extending axially beyond the opposite end of the inner race, and an elongated rod serving as a handle extending axially beyond said screw threaded extension and provided in its inner end with a screw threaded opening receiving the screw threaded extension therein, the inner end of said rod engaging the adjacent end of the inner race and clamping the inner race between said annular flange and rod, whereby said beam may rotate freely about said pointed extension while the pointed extension, inner race and rod serving as a handle remain stationary.

WILLIAM K. LANKFORD.

REFERENCES CITED

The following references are of record in the file of this patent:

UNITED STATES PATENTS

| Number | Name | Date |
|---|---|---|
| 677,339 | Comstock | July 2, 1901 |
| 985,978 | Coxhead | Mar. 7, 1911 |
| 1,115,390 | Cady | Oct. 27, 1914 |
| 1,153,092 | McDermott | Sept. 7, 1915 |
| 1,390,821 | Seals | Sept. 13, 1921 |
| 1,472,181 | Louden | Oct. 30, 1923 |
| 1,495,994 | Farmer | June 3, 1924 |
| 2,309,514 | Laxo | Jan. 26, 1943 |